(12) United States Patent
Miyamura et al.

(10) Patent No.: US 10,644,452 B2
(45) Date of Patent: May 5, 2020

(54) VEHICULAR WIRING SYSTEM WITH FIRST AND SECOND CONNECTOR HOUSINGS AND IDENTIFYING MEMBER THAT IS REMOVABLE ONLY WHEN FIRST AND SECOND CONNECTOR HOUSINGS ARE CONNECTED PROPERLY

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Tetsuya Miyamura, Mie (JP); Kazuaki Takeda, Mie (JP); Masaaki Tabata, Mie (JP); Yasuo Omori, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 15/781,819

(22) PCT Filed: Dec. 13, 2016

(86) PCT No.: PCT/JP2016/087120
§ 371 (c)(1),
(2) Date: Jun. 6, 2018

(87) PCT Pub. No.: WO2017/110597
PCT Pub. Date: Jun. 29, 2017

(65) Prior Publication Data
US 2018/0358750 A1    Dec. 13, 2018

(30) Foreign Application Priority Data
Dec. 24, 2015   (JP) ................................. 2015-250988

(51) Int. Cl.
*H01R 13/645* (2006.01)
*H01R 13/641* (2006.01)
(Continued)

(52) U.S. Cl.
CPC .......... *H01R 13/645* (2013.01); *G06K 19/07* (2013.01); *H01R 13/639* (2013.01);
(Continued)

(58) Field of Classification Search
CPC .. H01R 13/645; H01R 13/639; H01R 13/641; H01R 2201/26; G06K 19/07; B60R 16/0207
(Continued)

(56) References Cited

U.S. PATENT DOCUMENTS 3,611,261 A * 10/1971 Gregory ................. H01R 13/62
                                                                    340/687
4,486,065 A * 12/1984 Wittes ................ H01R 13/5812
                                                                    439/450
(Continued)

FOREIGN PATENT DOCUMENTS

DE    10 2004 007 353    9/2005
JP         3-297078      12/1991
(Continued)

OTHER PUBLICATIONS

International Search Report dated Feb. 7, 2017.
German Examination Report dated Aug. 2, 2019.

*Primary Examiner* — Travis S Chambers
(74) *Attorney, Agent, or Firm* — Gerald E. Hespos; Michael J. Porco; Matthew T. Hespos (57) ABSTRACT

A wiring system includes a plurality of connectors (C1 to C9). Each connector includes a first connector housing (10), a second connector housing (20) and a connector identifying member (30). The first connector housing (10) includes an identifying member holding portion for holding the connector identifying member (30). The second connector housing (20) includes a restraint releasing portion for releasing the restraint of the connector identifying member (30) only when the first and second connector housings (10, 20) are connected properly. Each connector identifying member
(Continued)

(30) holds identification information for distinguishing the connector to which the connector identifying member belongs.

6 Claims, 7 Drawing Sheets

(51) Int. Cl.
  *H01R 13/639* (2006.01)
  *G06K 19/07* (2006.01)
  *H01R 13/46* (2006.01)
  *H01R 13/627* (2006.01)
  *B60R 16/02* (2006.01)

(52) U.S. Cl.
  CPC ........ *H01R 13/641* (2013.01); *B60R 16/0207* (2013.01); *H01R 13/465* (2013.01); *H01R 13/6272* (2013.01); *H01R 2201/26* (2013.01)

(58) Field of Classification Search
  USPC ................................ 439/626, 488, 489, 491
  See application file for complete search history.

(56) References Cited

U.S. PATENT DOCUMENTS

| | | | | |
|---|---|---|---|---|
| 5,120,255 A | * | 6/1992 | Kouda | H01R 13/641 439/489 |
| 5,203,718 A | * | 4/1993 | Chishima | H01R 13/641 439/350 |
| 5,330,369 A | * | 7/1994 | Nozaki | H01R 13/641 439/350 |
| 5,507,666 A | * | 4/1996 | Yamanashi | H01R 13/641 439/354 |
| 6,261,116 B1 | * | 7/2001 | Ceru | H01R 13/6272 439/352 |
| 6,439,915 B2 | * | 8/2002 | Kurimoto | H01R 13/6272 439/352 |
| 7,214,085 B2 | * | 5/2007 | Ohtaka | H01R 13/6273 439/352 |
| 7,530,838 B2 | * | 5/2009 | Ohara | H01R 13/641 439/489 |
| 8,616,914 B2 | * | 12/2013 | Mumper | H01R 13/6272 439/489 |
| 9,004,780 B2 | * | 4/2015 | Yee | G02B 6/4293 385/147 |
| 10,044,140 B1 | * | 8/2018 | Gianrossi | H05K 7/1498 |
| 2002/0111048 A1 | * | 8/2002 | Kondoh | B60R 16/0207 439/34 |
| 2014/0273611 A1 | * | 9/2014 | Goggin | H01R 13/465 439/491 |

FOREIGN PATENT DOCUMENTS

| | | |
|---|---|---|
| JP | 7-192808 | 7/1995 |
| JP | 2006-65534 | 3/2006 |
| WO | 2015/111225 | 7/2015 |

\* cited by examiner

VEHICULAR WIRING SYSTEM WITH FIRST AND SECOND CONNECTOR HOUSINGS AND IDENTIFYING MEMBER THAT IS REMOVABLE ONLY WHEN FIRST AND SECOND CONNECTOR HOUSINGS ARE CONNECTED PROPERLY

BACKGROUND

Field of the Invention

The invention relates to a wiring system to be provided in a vehicle such as an automotive vehicle and including a plurality of connectors.

Description of the Related Art

Conventionally, a connector includes two connector housings that are connectable to each other. Such connectors are used widely for electrical connection at each of many locations in a vehicle. In such a connector, reliable detection as to whether or not the connector housings are connected completely is important in ensuring high connection reliability.

Japanese Unexamined Patent Publication No. H03-297078 discloses a connector provided with a connection detecting function. This connector includes first and second connector housings connectable to each other and a detection spacer to be locked detachably to the first connector housing. The first connector housing releases locking in such a manner that the detection spacer can be pulled out only in a state where the first connector housing is connected properly to the second connector housing. Thus, whether or not the connector housings are connected properly can be confirmed by visually confirming the presence or absence of the detection spacer.

Many connectors are distributed at locations distant from each other in a vehicular wiring system. Thus, even if each connector is provided with the connection detecting function as described above, it is difficult to collectively manage connected states of the respective connectors in the entire system, which is a problem. Specifically, an operation of visually inspecting each connected state after the connection of all the connectors distributed at the respective locations is not easy, and a possibility of overlooking or, conversely, repeated confirmation cannot be denied. Further, if this operation is shared by a plurality of workers, it is difficult to organize each piece of information.

The invention aims to provide a vehicular wiring system including connectors and capable of collectively and easily managing a connected state of each connector, and a management method.

SUMMARY

The invention is directed to a wiring system to be provided in a vehicle and including a plurality of connectors. Each connector includes a first connector housing, a second connector housing to be electrically connected to the first connector housing and a connector identifying member to be held in the first connector housing. The first connector housing includes an identifying member holding portion for holding the connector identifying member, and the identifying member holding portion includes a restraining portion for restraining the connector identifying member to prevent the separation of the connector identifying member from the first connector housing. The second connector housing includes a restraint releasing portion for releasing the restraint of the connector identifying member by the restraining portion to allow the separation of the connector identifying member only when the first and second connector housings are connected properly and not releasing the restraint when the first and second connector housings are not connected properly. The connector identifying member includes an identification information holding portion for holding identification information for distinguishing the particular connector to which the connector identifying member belongs.

The invention also is directed to a management method including preparing the above-described vehicular wiring system, causing the restraining portion of the identifying member holding portion of the first connector housing to restrain the connector identifying member in each of the connectors included in the vehicular wiring system, collecting the connector identifying member having the restraint by the restraining portion released through the connection of the first and second connector housings in each connector and released from the identifying member holding portion of the first connector housing, and specifying the connector, in which the first and second connector housings are not properly connected based on the identification information held in the identification information holding portion of each collected connector identifying member.

According to the vehicular wiring system and the management method therefor, it is possible not only to confirm a connected state of the connector housings in the connector based on the presence or absence of the connector identifying member in each connector, but also to easily determine the presence or absence of the connector, from which the connector identifying member is not collected, i.e. in which the connector housings are not connected properly, and specify the connector if there is any such connector based on the identification information held in the identification information holding portion of the connector identifying member collected from each of the properly connected connectors. Thus, the connected state of each connector can be managed collectively for all the connectors including the connector identifying member.

The vehicular wiring system may include a wiring harness to be routed in a vehicle and the connectors may be provided at locations different from each other in the wiring harness. Since the arranged positions of the connectors in the wiring harness are specified in this vehicular wiring system, the location of each connector can be specified easily based on the identification information held by the connector identifying member collected from each connector.

The identification information holding portion of each connector identifying member may include an IC chip for storing the identification information as electronic information. The identification information (electronic information) stored in the IC chip can be read easily, for example, by an IC chip reader. Further, the read identification information can be managed easily by a computer.

Alternatively, the identification information holding portion of each connector identifying member may be shaped to correspond to the identification information to be held and shaped to be different from the identification information holding portions of the other connector identifying members. That is, the identification information may be converted into the shape of the identification information holding portion.

DETAILED DESCRIPTION

A preferred embodiment of the present invention is described with reference to the drawings.

Figure 1:
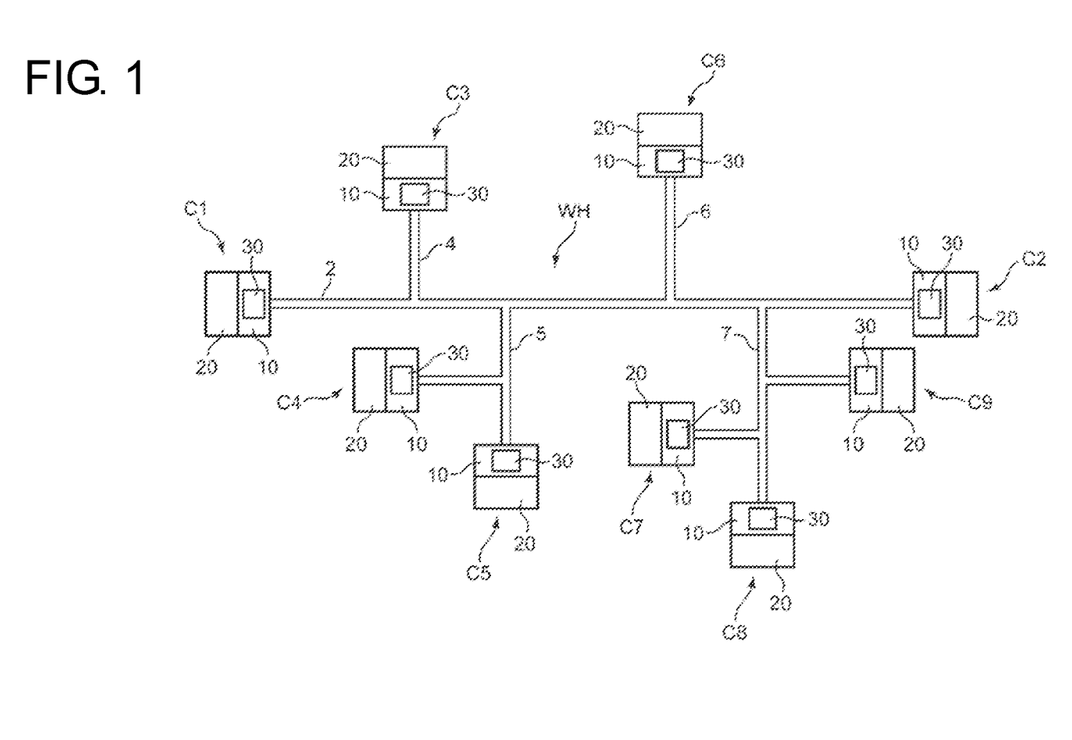
FIG. 1 is a view showing a wiring harness and a plurality of connectors provided on the wiring harness constituting a vehicular wiring system according to an embodiment of the present invention.
Figure 2:
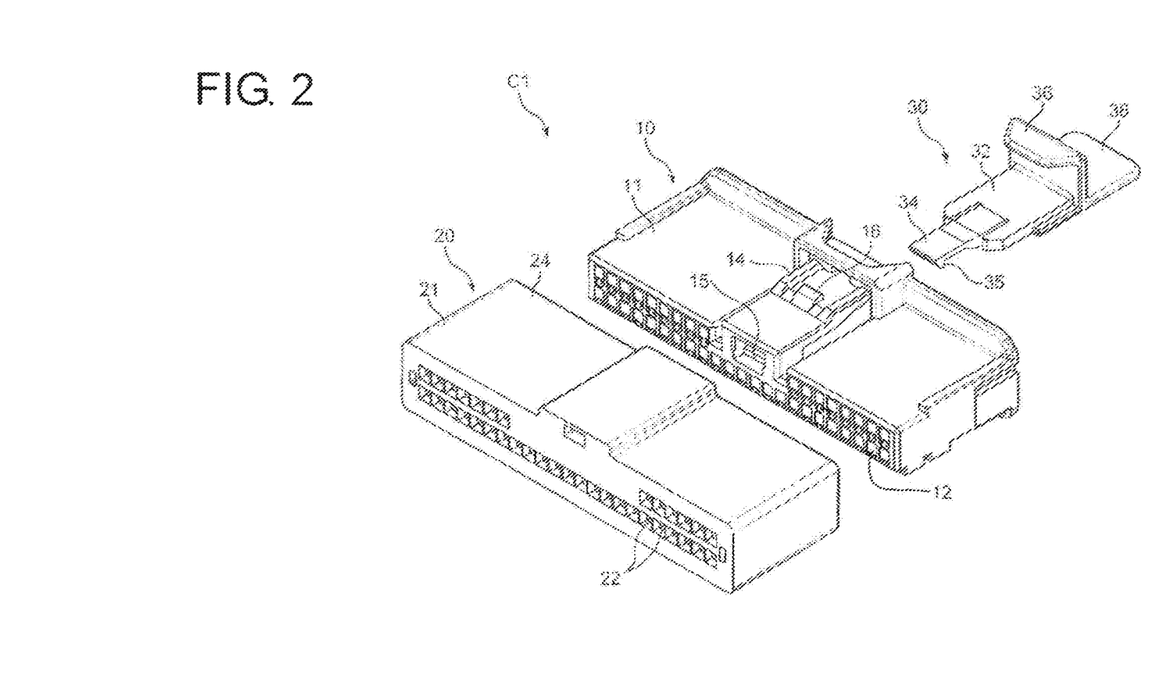
FIG. 2 is an exploded perspective view showing one of the plurality of connectors.
Figure 3:
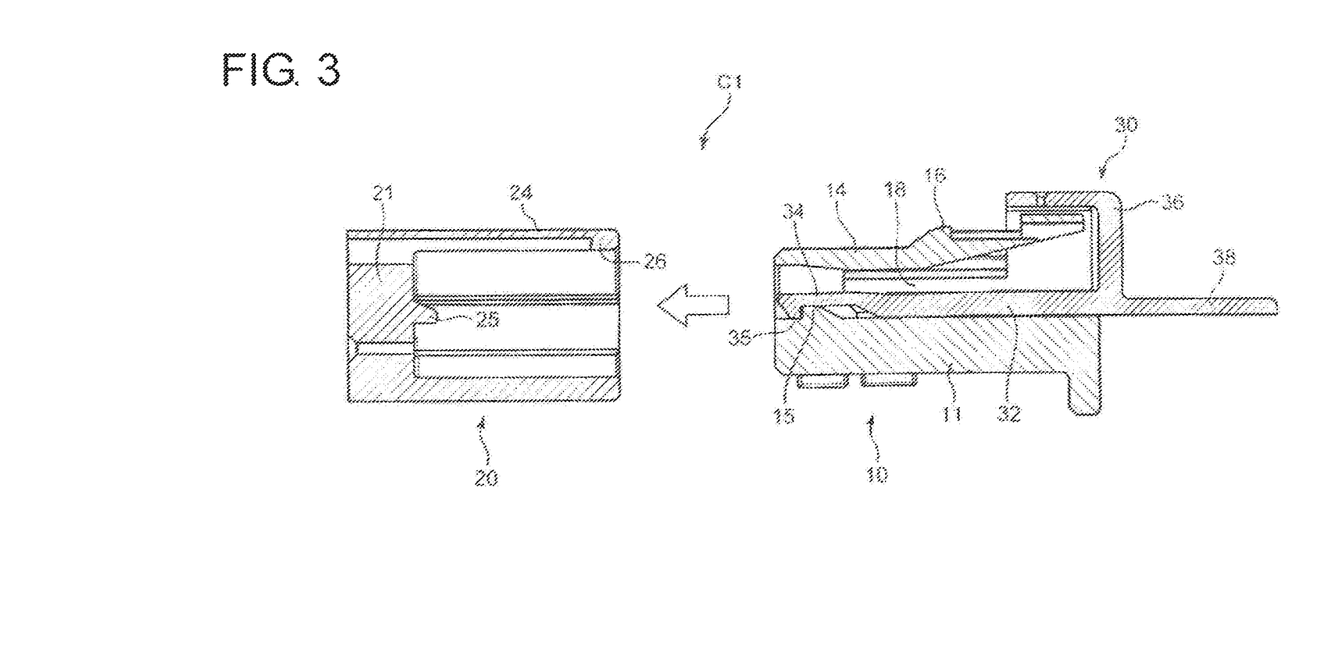
FIG. 3 is a section showing a state before a first connector housing and a second connector housing of the connector are connected.

FIG. 1 shows a vehicular wiring system according to the embodiment. This wiring system includes a wiring harness WH and connectors (nine connectors C1, C2, C3, C4, C5, C6, C7, C8 and C9 in this embodiment). The wiring harness WH is composed of wires bundled with each other and includes a main line 2 and branch lines 4, 5, 6 and 7 branched from the main line 2. The connectors C1 to C9 are provided on respective ends of the main line 2 and the branch lines 4 to 7. Specifically, the connectors C1 to C9 are distributed at locations different from each other in the wiring harness WH.

The connectors C1 to C9 of this embodiment have equal structures. FIGS. 2 to 6 show the structure of the connector C1 of these connectors as a representative. The connector C1 includes a first connector housing 10, a second connector housing 20 connectable to the first connector housing 10 and a connector identifying member 30.

The first connector housing 10 is connected to the wiring harness WH. Specifically, the first connector housing 10 collectively holds connector terminals respectively mounted on ends of wires included in the wiring harness W. More specifically, the first connector housing 10 includes a housing body 11 substantially in the form of a rectangular parallelepiped formed with terminal accommodation chambers 12 and accommodates and holds the first connection terminals in the respective terminal accommodation chambers 12.

The second connector housing 20 is provided on a connection target to be connected to the wiring harness WH. The connection target is, for example, another wiring harness or wires other than the wiring harness WH or an in-vehicle electronic device. The second connector housing 20 holds second connection terminals in an arrangement corresponding to the first connection terminals. Specifically, the second connector housing 20 includes a housing body 21 substantially in the form of a rectangular parallelepiped formed with terminal accommodation chambers 22 and accommodates and holds the second connection terminals in the respective terminal accommodation chambers 22.

Figure 4:
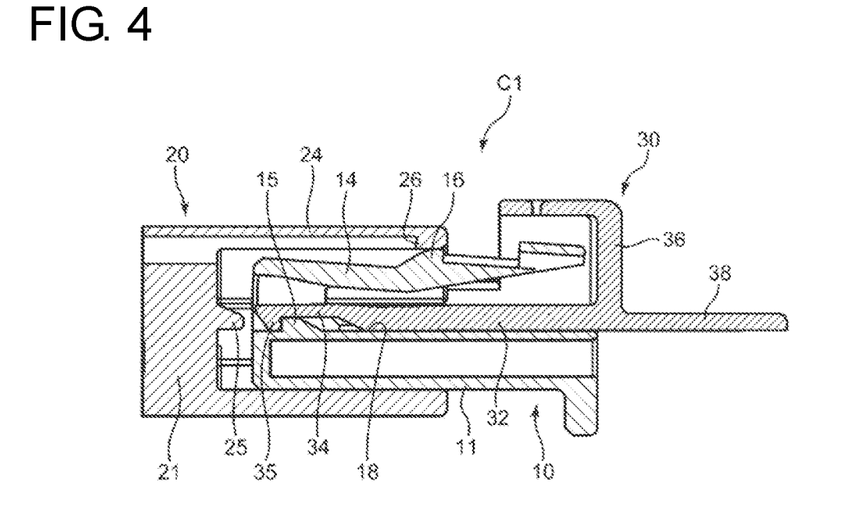
FIG. 4 is a section showing a state while the first and second connector housings are being connected.
Figure 5:
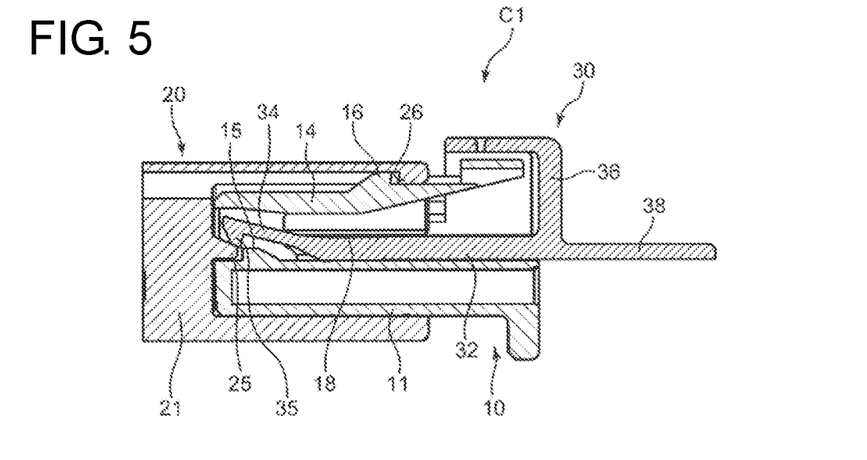
FIG. 5 is a section showing a state where the first and second connector housings are properly connected.
Figure 6:
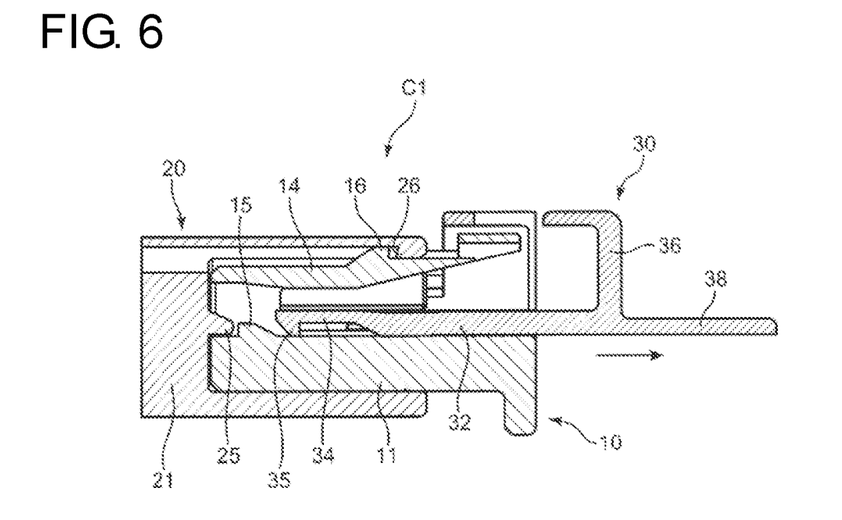
FIG. 6 is a section showing a state where a connector identifying member is separated from the first connector housing properly connected to the second connector housing.

The second connector housing 20 according to this embodiment includes a receptacle 24. The receptacle 24 is a rectangular tube extending in a specific direction (right in FIGS. 3 to 6) from the housing body 21. The receptacle 24 is open in the specific direction and is shaped to receive the first connector housing 10 fit into the receptacle 24. With the first connector housing 10 completely fit in the receptacle 24, as shown in FIGS. 5 and 6, the first connection terminals held in the first connector housing 10 and the second connection terminals held in the second connector housing 20 are connected to each other for electrical connection.

Each of the first and second connector housings 10, 20 is provided with a fitting lock. The fitting locks are engaged with each other with the first and second connector housings 10, 20 properly connected, thereby locking the connector housings 10, 20 in a connected state. Specifically, in this embodiment, a downward projecting locking projection 26 is formed on an end part of a ceiling wall of the receptacle 24, whereas a fitting lock piece 14 is formed in an upper part of the housing body 11 of the first connector housing 10 and an upward projecting locked projection 16 is formed on the upper surface of the fitting lock piece 14. The fitting lock piece 14 contacts the locking projection 26 as the first and second connector housings 10, 20 are connected, and is resiliently displaceable downwardly, as shown in FIG. 4, to allow the locking projection 26 to move over the locked projection 16. Further, as shown in FIGS. 5 and 6, the fitting lock piece 14 resiliently returns with the connection of the first and second connector housings 10, 20 properly completed, thereby entering a state where the locked projection 16 of the fitting lock piece 14 is locked by the locking projection 26, i.e. the first and second connector housings 10, 20 are locked in the connected state.

The first connector housing 10 includes an identifying member holding portion 18 for holding the connector identifying member 30. The identifying member holding portion 18 is formed between the upper surface of the housing body 11 and the fitting lock piece 14 and slidably holds the connector identifying member 30.

The connector identifying member 30 is held in such a manner as to be separable from the first connector housing 10 in a separating direction (direction parallel to a connecting direction in this embodiment) while holding identification information for distinguishing the connector (connector C1 in FIGS. 2 to 6), to which the connector identifying member 30 belongs, from the other connectors. Specifically, the connector identifying member 30 according to this embodiment includes a body 32, a locked piece 34, a lock piece covering portion 36 and the identification information holding portion.

The body 32 is formed into a shape holdable in the first connector housing 10, specifically in the form of a flat plate slidably insertable into the identifying member holding portion 18.

The locked piece 34 is a part to be locked to the first connector housing 10, extends forward, i.e. in a direction parallel to the separating direction from the body portion 32 and toward the second connector housing 20, and includes a front end part that is deflectable and deformable upward. The front end part is formed with a locked portion 35, which is a restrained portion. The locked portion 35 is formed by a downward projection.

In contrast, the identifying member holding portion 18 of the first connector housing 10 includes a locking portion 15. The locking portion 15 is a restraining portion for locking, i.e. restraining the locked portion 35. The locking portion 15 according to this embodiment is a front end part of the identifying member holding portion 18, i.e. an end part near the second connector housing 20, is formed by a projection formed on a back end part in an inserting direction of the connector identifying member 30, and projects up from the upper surface of the housing body 11. The locking portion 15 prevents the connector identifying member 30 from being separated from the identifying member holding portion 18 in the separating direction (direction of separating the connector identifying member 30 from the second connector housing 20 as indicated by an arrow in FIG. 6) by engaging the locked portion 35 and operating in cooperation with the fitting lock piece 14, which is deflected and deformed downward during the connecting operation, as described above.

On the other hand, the second connector housing 20 includes a lock releasing portion 25, which is a restraint releasing portion. The lock releasing portion 25 releases the locking, i.e. the restraint of the locked portion 15 by the locking portion 35 only when the first and second connector housings 10, 20 are connected properly. Specifically, the lock releasing portion 25 is formed by a projection projecting into the receptacle 24 from the housing body 21 and contacts the locked portion 35 of the connector identifying member 30 to forcibly deflect and deform the connector identifying member 30 up when the first connector housing 10 is fit to the back of the receptacle 24, thereby releasing the locking of the locked portion 35 by the locking portion 15.

The lock piece covering portion 36 is shaped to cover the fitting lock piece 14 with the connector identifying member 30 held in the identifying member holding portion 18 of the first connector housing 10. As just described, the lock piece covering portion 36 prevents the fitting lock piece 14 of the first connector housing 10 from being operated to release the locking with the connector identifying member 30 held in the first connector housing 10.

The structure described above is given to all the connectors C1 to C9 together with the identification information holding portion described below.

The identification information holding portion holds the information for distinguishing the connector (connector C1 in FIGS. 2 to 6) to which the connector identifying member 30 belongs, from the other connectors. The identification information holding portion according to this embodiment includes an operated piece 38 extending toward a side opposite to the locked piece 34 from the body 32, i.e. forward in the separating direction. The operated piece 38 functions as a part to be gripped to pull out the connector identifying member 30 from the first connector housing 10 in the separating direction and also as a constituent element of the identification information holding portion.

Figure 7:
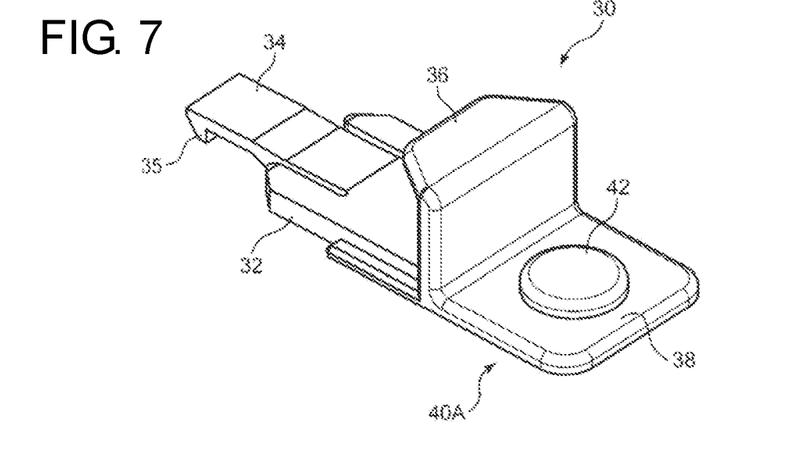
FIG. 7 is a perspective view showing a first example of the connector identifying member included in the connector and including an IC chip as an identification information holding portion.

FIG. 7 shows an identification information holding portion 40A according to a first example. This identification information holding portion 40A further includes an IC chip 42 provided on a surface of the operated piece 38. The IC chip 42 stores the identification information as electronic information. This identification information is, for example, an identification number given to each connector C1 to C9.

Figure 8:
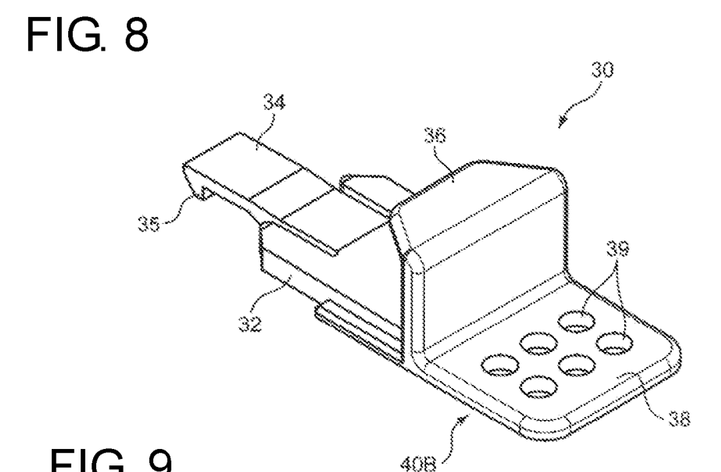
FIG. 8 is a perspective view showing a second example of the connector identifying member included in the connector and including an identification information holding portion having a plurality of through holes, all of which are not closed.

FIG. 8 shows an identification information holding portion 40B according to a second example. This identification information holding portion 40B include through holes 39 (six in the example shown in FIG. 8) formed in the operated piece 38 and hole filling materials 44 that can be filled into arbitrary ones of the plurality of through holes 38 to close the through holes. In the identification information holding portion 40B according to this example, identification information for distinguishing the connectors C1 to C9 from each other is specified by a combination of the through holes 39 closed with the hole filling materials 44.

Figure 10:
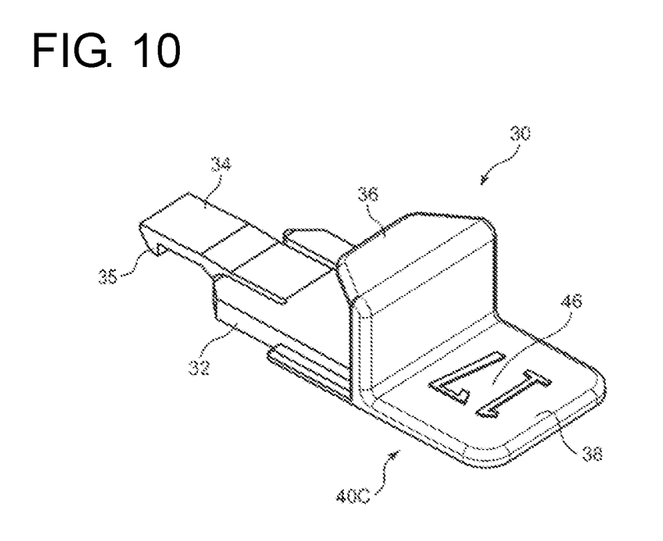
FIG. 10 is a perspective view showing a third example of the connector identifying member included in the connector and including a part printed with an identification number as an identification number holding portion.

FIG. 10 shows an identification information holding portion 40C according to a third example. This identification information holding portion 40C includes an identification mark 46 formed on the surface of the operated piece 38. This identification mark 46 is, for example, formed by printing an identification number on the operated piece 38.

According to the vehicular wiring system described above, the connected states of the respective connectors C1 to C9 are managed collectively, easily and reliably in the following manner.

1) Mounting of Connector Identifying Member into First Connector Housing

The connector identifying member 30 is mounted into the first connector housing 1 before the first and second connector housings 10, 20 are connected in each connector C1 to C9. Specifically, the body 32 of the connector identifying member 30 is inserted into the identifying member holding portion 18 of the first connector housing 10 in a direction opposite to the separating direction. The body 32 is inserted up to a position where the locked portion 35 of the connector identifying member 30 moves over the locking portion 15 of the identifying member holding portion 18, i.e. a position where the locked portion 35 is locked by the locking portion 15.

2) Connection of Connector Housings and Collection of Connector Identifying Member The corresponding second connector housing 20 is connected to each first connector housing 10 to achieve an electrical connection between the wiring harness WH, shown in FIG. 1, and its peripheral circuit.

In this embodiment, the connection is performed by fitting the first connector housing 10 into the receptacle 24 of the second connector housing 20, as shown in FIGS. 3 to 6. During the connecting operation, the locked projection 16 of the fitting lock piece 14 of the first connector housing 10 contacts the locking projection 26 of the second connector housing 20, as shown in FIG. 4, to displace the fitting lock piece 14 down. Thus, in this stage, the separation of the connector identifying member 30 from the identifying member holding portion 18 is prevented by locking the locked portion 35 of the connector identifying member 30 with the locking portion 15. Accordingly, the connector identifying member 30 cannot be separated from the first connector housing 10 while the first and second connector housings 10, 20 are connected incompletely.

On the other hand, when the first connector housing 10 is fit completely, the fitting lock piece 14 resiliently returns and the locked projection 16 thereof is locked by the locking projection 26 of the second connector housing 20, as shown in FIG. 5. Thus, the first and second connector housings 10, 20 are locked in the connected state and the lock releasing portion 25 of the second connector housing 20 forcibly deflects and deforms the locked portion 35 of the connector identifying member 30 upward, thereby releasing the locking of the locked portion 35 by the locking portion 15. Accordingly, in this state, a worker can separate and collect the connector identifying member 30 from the first connector housing 10 in the separating direction indicated by the arrow of FIG. 6, for example, by griping the operated piece 38.

3) Determination of Connected State

Even if the respective connectors C1 to C9 are not inspected at the arranged locations, it is possible to specify the connector, in which the connector housings are connected incompletely, based on the identification information held by the connector identifying members 30 collected from the respective connectors as described above.

For example, if the number of the collected connector identifying members 30 matches a total number (nine in this embodiment) of the connectors including the connector identifying members 30, it can be determined that the first and second connector housings 10, 20 are connected completely in all of the connectors C1 to C9. Conversely, if the number of the connector identifying members 30 is below the total number of the connectors, there are some connectors in which the first and second connector housings 10, 20 are not connected or are connected incompletely.

Further, in this vehicular wiring system, the connector to which the collected connector identifying member belongs can be specified from the identification information held by the identification information holding portion of each connector identifying member 30. Thus, the connector in which the first and second connector housings 10, 20 are not connected or are connected incompletely can be specified immediately.

For example, the electronic identification information stored in the IC chip 42 in the identification information holding portion 40A shown in FIG. 7 can be read, for example, by an IC chip reader. Thus, the connector to which the connector identifying member 30 including the identification information holding portion 40A belongs can be specified. Further, the read electronic information can be input directly to a computer and managed in a centralized manner. Thus, even a large number of connectors can be dealt with easily. Further, the connector identifying member 30 can be reused by erasing the electronic information stored in the IC chip 42 after use.

Figure 9:
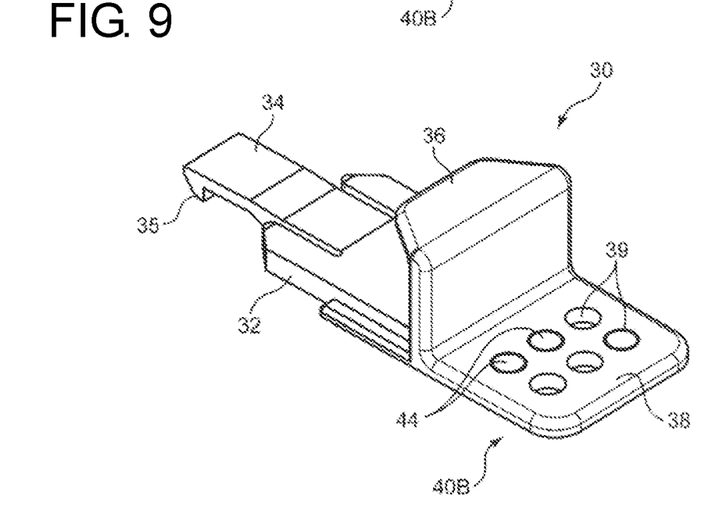
FIG. 9 is a perspective view showing a state where hole filing materials for giving identification information are filled into specific ones of the plurality of through holes of the connector identifying member shown in FIG. 8.

In the identification information holding portion 40B according to the second example shown in FIGS. 8 and 9, the number and positions of the through holes 39 not closed by the hole filling materials 44 can be read by an optical sensor or the like to determine the identification information associated with the read number and positions. Also in this second example, the connector identifying member 30 can be reused by removing the hole filling materials 44.

On the other hand, in the identification information holding portion 40C according to the third example shown in FIG. 10, the identification information can be obtained by visually confirming the identification mark 46 given to the operated piece 38 or reading the identification mark 46 by a dedicated reader.

The invention is not limited to the embodiment described above. The invention includes, for example, the following aspects.

Concerning Disposed Locations of Plurality of Connectors

The invention also encompasses a wiring system that includes plural wiring harnesses and in which connectors are distributed in each wiring harness. In this case, all of the connectors provided in each wiring harness can be managed collectively in the same manner as described above.

Concerning Connector Housings

The first and second connector housings included in each connector merely have to be connectable to each other and specific structures thereof do not matter. Further, the invention also includes cases where plural second connector housings are connected to a single first connector housing and cases where plural first connector housings are connected to a single second connector housing. In these cases, a connector identifying member preferably is given for each connection. For example, the first connector housing may include a plurality of identifying member holding portions.

Concerning Management Target

The connector identifying member need not be given to all the connectors included in the vehicle. It is sufficient to give the connector identifying member to the connectors, the connection of the connector housings of which are required to be managed collectively. In other words, the vehicular wiring system according to the present invention may include only some of all connectors to be mounted in one vehicle.

Concerning Connector Identifying Member and Holding Thereof

The shape and structure of the connector identifying member according to the invention can be set freely. The connector identifying member may have, for example, a ball or column shape. A mode of the identifying member holding portion to restrain the connector identifying member and a mode of the restraint releasing portion to release restraint also are not limited to those shown in FIGS. 2 to 6. For example, the identifying member holding portion may be formed with a restraining chamber for confining the connector identifying member and the restraint releasing portion may include a window for opening the restraining chamber.

Concerning Identification Information Holding Portion

The identification information holding portion is not limited to the examples shown in FIGS. 7 to 10. For example, the second example shown in FIGS. 8 and 9 provides the identification information by the number and positions of the through holes 39 actually open in the operated piece 38, i.e. by the shape of the operated piece 38, but a shape for providing the identification information is not limited to the one including the through holes. For example, the identification information may be provided by the entire shape of the operated piece 38 or by the number, interval or the like of recesses and projections provided on an edge of the operated piece 38. Further, the through holes may not be closed ex post facto by the hole filling materials. For example, through holes may be provided only at positions determined in advance to form identification information.

Further, a part of the connector identifying member where the identification information holding portion is formed is not limited. For example, the operated piece 38 of the connector identifying member 30 shown in FIGS. 7 to 10 may be omitted and an identification information holding portion may be provided on another part, such as the body portion 32 or the lock piece covering portion 36.

A vehicular wiring system capable of collectively and easily managing connected states of the respective connectors and a management method therefor are provided as described above.

The invention claimed is:

1. A vehicular wiring system to be provided in a vehicle, comprising a plurality of connectors, wherein:
each of the connectors includes a first connector housing, a second connector housing to be electrically connected to the first connector housing and a connector identifying member to be held in the first connector housing;
the first connector housing includes an identifying member holding portion configured for holding the connector identifying member, the identifying member holding portion includes a restraining portion that is releasably engageable with a restrained portion of the connector identifying member for restraining the connector identifying member to prevent separation of the connector identifying member from the first connector housing, a fitting locking piece on a side of the identifying member holding portion opposite the restraining portion, the fitting locking piece having a locked projection;
the second connector housing includes a locking projection configured to engage the locked projection of the fitting locking piece when the first and second connector housings are connected properly, a restraint releasing portion spaced from the locking projection and configured for releasing the restrained portion of the connector identifying member from the restraining portion of the identifying member holding portion of the first connector housing to allow the separation of the connector identifying member only when the first and second connector housings are connected properly and not releasing the restraint when the first and second connector housings are not connected properly; and
the connector identifying member includes an identification information holding portion with identification information that identifies the connector to which the connector identifying member belongs, wherein
the second connector housing has a front end, a receptacle open into the front end of the second connector housing and configured for receiving the first connector housing, the releasing portion projecting forward from a rear wall of the receptacle, the locking projection projecting from a wall of the receptacle adjacent the front end of the second connector housing.

2. The vehicle wiring system of claim 1, wherein the connector identifying member includes a body with opposite front and rear ends, the restraining portion being disposed on the front end of the body of the connector identifying member, a covering portion projecting from the rear end of the body of the connector identifying member, the covering portion being configured for covering a side of the fitting locking piece opposite the identifying member holding portion, the connector identifying member further including an operated portion projecting rearward of the body of the connector identifying member and configured to be gripped for pulling the connector identifying member out of the identifying member holding portion, the identifying information being disposed on the operated portion.

3. The vehicle wiring system of claim 1, wherein the first connector includes a housing body having at least one terminal accommodation chamber formed therein, the identifying member holding portion being disposed adjacent the housing body, the fitting locking piece being supported deflectably on a side of the identifying member holding portion opposite the housing body, the locked projection being disposed on a side of the fitting locking piece facing away from the identifying member holding portion.

4. The vehicle wiring system of claim 3, wherein the identifying member restraining portion is formed on a side of the housing body facing toward the identifying member holding portion and the fitting locking piece.

5. A vehicle wiring system to be provided in a vehicle, comprising a plurality of connectors, wherein:
each of the connectors includes a first connector housing, a second connector housing to be electrically connected to the first connector housing and a connector identifying member to be held in the first connector housing;
the first connector housing includes a housing body having at least one terminal accommodation chamber formed therein, an identifying member holding portion disposed adjacent the housing body and configured for holding the connector identifying member, the identifying member holding portion includes a restraining portion that is releasably engageable with a restrained portion of the connector identifying member for restraining the connector identifying member to prevent separation of the connector identifying member from the first connector housing, a fitting locking piece supported deflectably on a side of the identifying member holding portion opposite the housing body and opposite the restraining portion, the fitting locking piece having a locked projection on a side of the fitting locking piece facing away from the identifying member holding portion;
the second connector housing includes a locking projection configured to engage the locked projection of the fitting locking piece when the first and second connector housings are connected properly, a restraint releasing portion spaced from the locking projection and configured for releasing the restrained portion of the connector identifying member from the restraining portion of the identifying member holding portion of the first connector housing to allow the separation of the connector identifying member only when the first and second connector housings are connected properly and not releasing the restraint when the first and second connector housings are not connected properly; and
the connector identifying member includes an identification information holding portion with identification information that identifies the connector to which the connector identifying member belongs, wherein
the first connector housing has a front end configured for connection with the second connector housing, the fitting locking piece being cantilevered rearward from the front and of the first connector housing, the identifying member having a covering portion disposed a side of the fitting locking piece opposite the identifying member holding portion to prevent inadvertent deflection of the fitting locking piece.

6. The vehicle wiring system of claim 5, wherein the second connector housing has a front end, a receptacle open into the front end of the second connector housing and configured for receiving the first connector housing, the releasing portion projecting forward from a rear wall of the receptacle, the locking projection projecting from a wall of the receptacle adjacent the front in of the second connector housing.

* * * * *